(12) United States Patent
Bublitz et al.

(10) Patent No.: US 12,377,486 B2
(45) Date of Patent: Aug. 5, 2025

(54) LIGHT RING FOR A SOLDERING IRON

(71) Applicant: Apex Brands, Inc., Apex, NC (US)

(72) Inventors: Scott Bublitz, Denver, NC (US); Pratik Bendale, Charlotte, NC (US); Brian Butler, Charlotte, NC (US); Dawn Huston, Leesville, SC (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 17/768,626

(22) PCT Filed: Oct. 8, 2020

(86) PCT No.: PCT/US2020/054698
§ 371 (c)(1),
(2) Date: Apr. 13, 2022

(87) PCT Pub. No.: WO2021/076388
PCT Pub. Date: Apr. 22, 2021

(65) Prior Publication Data
US 2024/0293885 A1    Sep. 5, 2024

Related U.S. Application Data

(60) Provisional application No. 62/916,279, filed on Oct. 17, 2019.

(51) Int. Cl.
*B23K 3/00* (2006.01)
*B23K 3/02* (2006.01)
*B23K 3/08* (2006.01)

(52) U.S. Cl.
CPC ............... *B23K 3/08* (2013.01); *B23K 3/025* (2013.01)

(58) Field of Classification Search
CPC ...... B23K 9/0956; B23K 9/0953; B23K 9/32; B23K 3/02; B23K 3/025; B23K 3/08; B25B 23/18
See application file for complete search history.

(56) References Cited

U.S. PATENT DOCUMENTS

| 4,875,751 | A | * | 10/1989 | Ostermeier | G01D 15/24 385/119 |
| 4,959,761 | A | * | 9/1990 | Critelli | F21V 19/002 362/800 |
| 5,032,960 | A | * | 7/1991 | Katoh | F21V 5/04 362/240 |
| 2004/0263802 | A1 | * | 12/2004 | Seki | H04N 9/3164 353/99 |

(Continued)

OTHER PUBLICATIONS

International Search Report and Written Opinion of corresponding International Application No. PCT/US2020/054698 mailed on Jan. 11, 2021, all enclosed pages cited.

*Primary Examiner* — Erin B Saad
(74) *Attorney, Agent, or Firm* — BURR & FORMAN LLP

(57) ABSTRACT

A soldering tool may include a tip portion and a tool body. The tool body may include a handle and the tip portion may be operably coupled to the tool body at a flange that separates the handle from the tip portion. The tip portion may include a tip that is heated to melt solder. The flange may include an end face and a light ring disposed at the end face. The light ring may be configured to direct light toward the tip.

11 Claims, 6 Drawing Sheets

(56) References Cited

U.S. PATENT DOCUMENTS

| | | | | |
|---|---|---|---|---|
| 2011/0188232 | A1* | 8/2011 | Friedman | F21S 9/04 |
| | | | | 362/119 |
| 2011/0260599 | A1* | 10/2011 | Qiu | F21K 9/27 |
| | | | | 313/46 |
| 2015/0202753 | A1* | 7/2015 | Mittmann | B23K 3/0338 |
| | | | | 362/120 |
| 2015/0375327 | A1* | 12/2015 | Becker | G06T 1/00 |
| | | | | 219/130.01 |
| 2015/0379894 | A1* | 12/2015 | Becker | G09B 19/24 |
| | | | | 219/137 R |
| 2017/0046977 | A1* | 2/2017 | Becker | G09B 19/003 |
| 2017/0368627 | A1 | 12/2017 | Shigekawa et al. | |
| 2019/0299312 | A1* | 10/2019 | Axinte | B23K 3/0307 |
| 2019/0351822 | A1* | 11/2019 | Morgan | B60Q 3/64 |
| 2020/0281062 | A1* | 9/2020 | Van Bommel | H05B 47/11 |
| 2020/0375005 | A1* | 11/2020 | Gu | G03B 15/03 |
| 2022/0397581 | A1* | 12/2022 | Ando | G01N 21/3151 |
| 2022/0406247 | A1* | 12/2022 | Richter | H01L 31/147 |

* cited by examiner

LIGHT RING FOR A SOLDERING IRON

TECHNICAL FIELD

Example embodiments generally relate to soldering tools and, in particular, relate to such a tool having a light ring configured to generate light toward the tip of the soldering tool without casting unwanted shadows.

BACKGROUND

Soldering tools, which are sometimes referred to as soldering irons or soldering guns, are commonly used in electronics manufacturing and repair activities along with other crafts and industries that involve metalwork. Soldering tools are typically used to join metallic items together at a joint by melting a filler metal (i.e., solder) into the joint. The solder has a lower melting point than the items being joined together at the joint, so the soldering tool needs to apply heat sufficient to melt the solder, but not hot enough to melt the items being joined.

Although a number of soldering tool designs have been proposed, a basic soldering tool design includes at least a tip portion that is operably coupled to a heater. The tip portion may, due to operation of the heater, become hot enough to melt the solder that contacts the tip portion. The tip portion may, in some cases, be removable/interchangeable so that a number of different geometries (e.g., sizes and/or shapes) of tips or bits can be substituted for respective different jobs. For example, some tip geometries (or shapes) may include a fine conical tip, a tapered chisel tip, a pyramid tip, a triangular flat face tip, a wide flat face tip, etc., where different sizes may further be available within each respective shape category.

Soldering is often performed at a work station, and may be performed in some cases on components that are in difficult to reach places. In either case, it is typically desirable to have a sufficiently well-lit environment in which to perform soldering, to ensure that greater visibility of the tip and the components being joined can be achieved. For a typical soldering tool, the lighting of the components and tip may be entirely accomplished using external light sources. Although more recent soldering tools have been provided with lighting components directly on the soldering iron itself, these lighting components are notorious for providing uneven lighting and casting distracting shadows.

As can be appreciated from the limitations described above, it may be desirable to improve soldering tool designs. For example, improvements in soldering tool design may enable better provision of light directed toward the tip.

BRIEF SUMMARY OF SOME EXAMPLES

Some example embodiments may enable the provision of a light ring that evenly distributes light around the tip to improves the visibility of the components being joined and the tip of soldering tools.

In an example embodiment, a soldering tool may be provided. The soldering tool may include a tip portion and a tool body. The tool body may include a handle and the tip portion may be operably coupled to the tool body at a flange that separates the handle from the tip portion. The tip portion may include a tip that is heated to melt solder. The flange may include an end face and a light ring disposed at the end face. The light ring may be configured to direct light toward the tip.

In another example embodiment, a light ring for a soldering tool is provided. The soldering tool may include a tool body and a tip portion. The tool body may include a handle. The tip portion may be operably coupled to the tool body at a flange that separates the handle from the tip portion. The tip portion may include a tip that is heated to melt solder. The light ring may include an annular lens and a plurality of LEDs. The plurality of LEDs may be disposed at a circuit board that is provided proximate to the flange.

In another example embodiment, a method of operating a soldering tool that includes a tool body and a tip portion may be provided. The tool body may include a handle. The tip portion may be operably coupled to the tool body at a flange that separates the handle from the tip portion. The tip portion may also include a tip that is heated to melt solder. The method includes providing power to a heater disposed in a tip of the tip portion via the controller, and providing light directed to a target area proximate to the tip via a light ring disposed in an end face of the flange. In some cases, providing the light may include either turning the light on or off via a user interface, or providing the light whenever power is provided to the heater.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
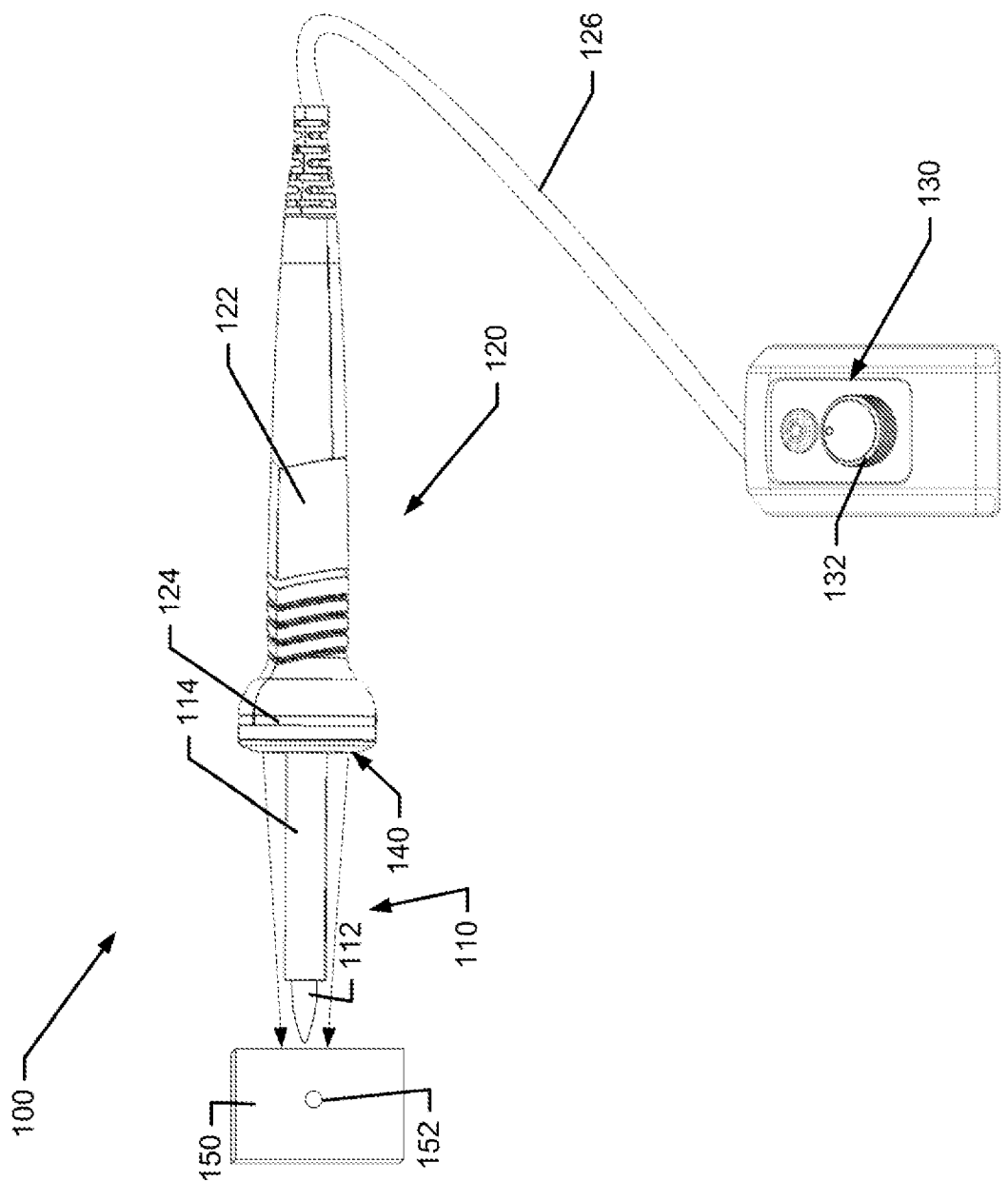
FIG. 1 illustrates a soldering tool employing a light ring according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a soldering tool that includes a light ring to evenly distribute light proximate to the tip of the soldering tool. A soldering tool employing the light ring of example embodiments may include, for example, capabilities for evenly distributing light around all sides of the tip without the production of shadows. Accurate application of solder and improved soldering joints may therefore be easier to achieve due to improved lighting proximate to the tip portion.

FIG. 1 illustrates a soldering tool 100 according to an example embodiment. As shown in FIG. 1, the soldering tool 100 of an example embodiment may include a tip portion 110 and a tool body 120. The tip portion 110 may include a tip 112 (or bit), which is removable from a sleeve (collet or bit holder) 114 in this case. However, the tip 112 may not be removable in some cases. The tip 112 may, in some cases, be screwed into the sleeve 114. This may be performed using a tool for tightening. Thus, to avoid any need for a tool, configuring the sleeve 114 as a collet, which is configured to enable gripping of the tip 112 without a tool. In some cases, the sleeve 114 may include a slotted rod into which the tip 112 is press fitted or snap fitted.

The tool body 120 of this example includes a handle 122 (or handpiece) that generally extends rearward from the top portion 110 inline therewith. In some cases, the tool body 120 may also house or include electronics for directing operation of the components of the tip portion 110. The handle 122 may be substantially cylindrical in shape. However, tapering or other shaping strategies may be employed on the handle to improve the aesthetic appearance or the comfort of the grip for the user. In some cases, the handle 122, the sleeve 114 and the tip 112 share a common axis, which is the longitudinal axis of the tip portion 110 and the tool body 120. The sleeve 114 may be made of metal, and may heat up with usage of the soldering tool 100. Thus, it may be desirable to provide a distinct separator between the handle 122, where the user's hand grips the tool body 120, and the sleeve 114. Accordingly, a collar or flange 124 may be employed to separate the sleeve 114 from the handle 122 and prevent the user's hand from sliding up the handle 122 and onto the sleeve 114.

Figure 10:
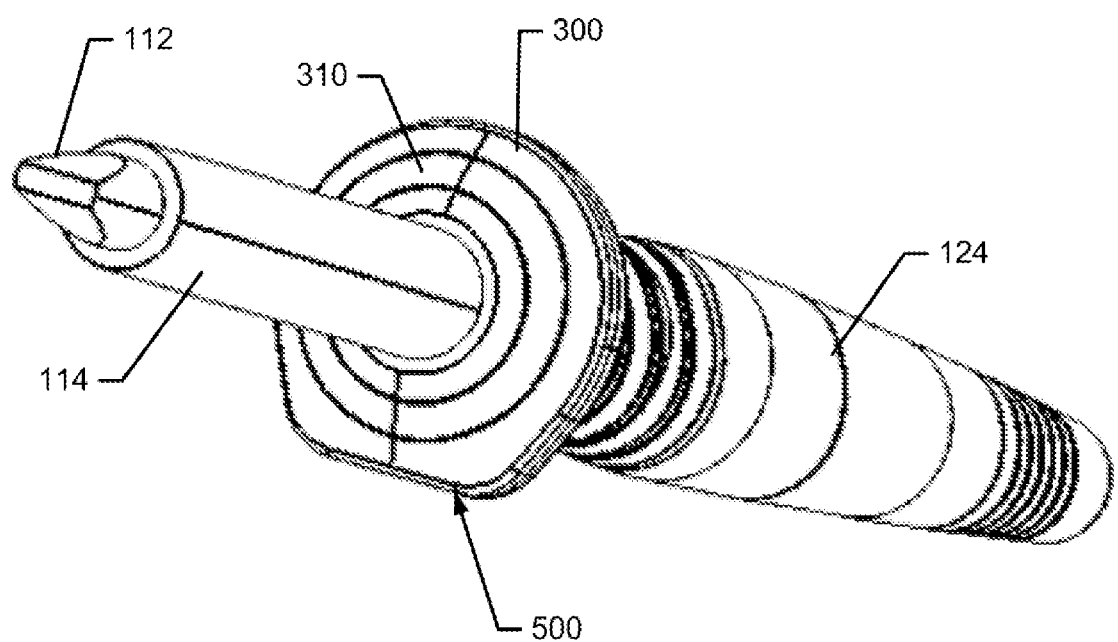
FIG. 10 illustrates a front perspective view of an alternative soldering tool design that employs an anti-roll stand.

In an example embodiment, the flange 124 may be embodied as a disc or other structure of enlarged diameter relative to the diameter of the handle 122. The flange 124 may, in some cases, have a consistent diameter, and therefore a circular periphery. However, in some embodiments, the flange 124 may include a flat side to enable the tool body 120 to rest on a surface (e.g., of the work bench or table top) with effectively only the flat side of the flange 124 and a rear portion of the handle 122 touching the surface. This suspends the tip 112 in the air so that the surface (or other items) are not damaged by contact with the tip 112. The flat side also prevents rolling of the tool body 120 around an axis of the flange 124 (which is also coaxial with the longitudinal axis of the tool body 120 and the tip portion 110. The flat side may be referred to as an anti-roll stand 500 and is shown in the perspective view of an alternative embodiment shown as FIG. 10.

In an example embodiment, the tool body 120 may include or interface with a cable 126 or power cord. The power cord or cable 126 may operably couple the tool body 120 and the tip portion 110 to a power unit 130. Thus, the power unit 130 may provide power and/or control signals to the tool body 120 and the tip portion 110 via the cable 126. The power unit 130 may include a display, operating dial, buttons, keys or other user interface 132 component for enabling control of the soldering tool 100 and provision of information regarding operation of the soldering tool 100 to the user. However, it should be appreciated that some example embodiments may plug directly into a power source (e.g., a power outlet) such that functions of the power unit 130 are effectively contained within control circuitry onboard or inside the tool body 120. Thus, the power unit 130 could be entirely eliminated in some embodiments, but effectively all of the other components of FIG. 1 may remain and otherwise function in similar fashion.

Figure 2:
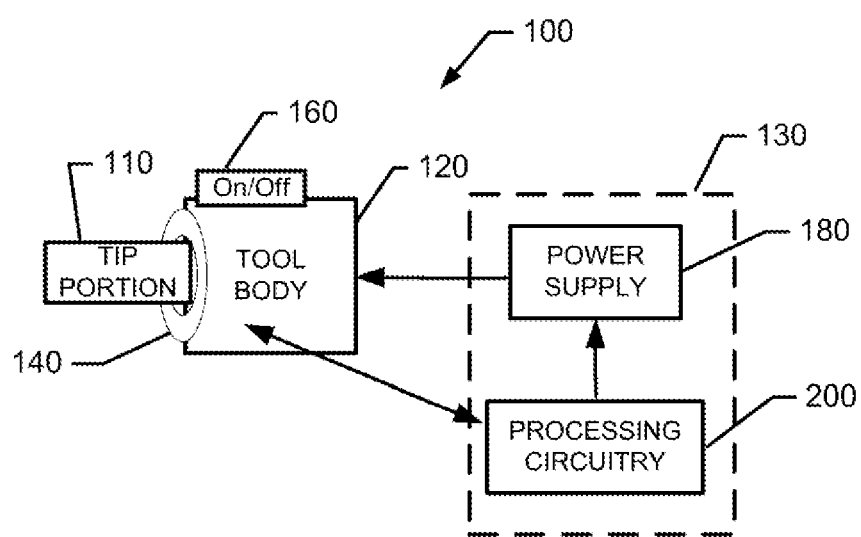
FIG. 2 illustrates a block diagram of the soldering tool according to an example embodiment.

FIG. 2 illustrates a block diagram of various components of the soldering tool 100 in accordance with an example embodiment. Referring now to FIG. 2, the power unit 130 may include a power supply 180 (e.g., mains power) and processing circuitry 200 in the form of a central processing unit (CPU) or other controller. The processing circuitry 200 may be configured to perform data processing, control function execution and/or other processing and management services for the power unit 130 specifically, and other portions of the soldering tool 100 generally, according to an example embodiment. In some embodiments, the processing circuitry 200 may be embodied as a chip or chip set. In other words, the processing circuitry 200 may comprise one or more physical packages (e.g., chips) including materials, components and/or wires on a structural assembly (e.g., a baseboard). In an example embodiment, the processing circuitry 200 may include one or more instances of a processor and memory that may be in communication with or otherwise control various components to which the processing circuitry 200 is operably coupled (e.g., the tool body 120, the tip portion 110, and components thereof).

The power unit 130 may provide power to the tip portion 110 via the tool body 120. The power provided may be used for heating the tip 112 via a heater. The heater may be or include a resistive element that generates heat responsive to the running of current therethrough. The heater may be disposed at or near the tip 112 of the tip portion 110 and may heat metal in the tip 112 as the temperature of the heater rises.

In an example embodiment, the power provided by the power unit 130 may also be used for powering a light ring 140. The light ring 140 may be disposed within the tool body 120 in such a way as to be coaxial with the longitudinal axis of the tool body 120 and tip portion 110. As such, the light generated by the light ring 140 may emanate around all peripheral sides of the tip 112 as shown in FIG. 1. To the extent a workpiece 150 has a target area 152 to which solder is to be applied. The target area 152 will be equally illuminated around all sides of the tip 112 so that the tip 112 does not cast any shadows on the workpiece 150 or the target area 152. The light ring 140 may be on any time power is provided (e.g., to the tip 112), or when actuated by the user interface 132 at the power unit 130. However, in some cases, the handle 122 (or some other part of the tool body 120) may include a button, switch or other operable member that controls the application of power to the light ring 140. On/off button 160 in FIG. 2 illustrates an example of such an operable member.

Figure 3:
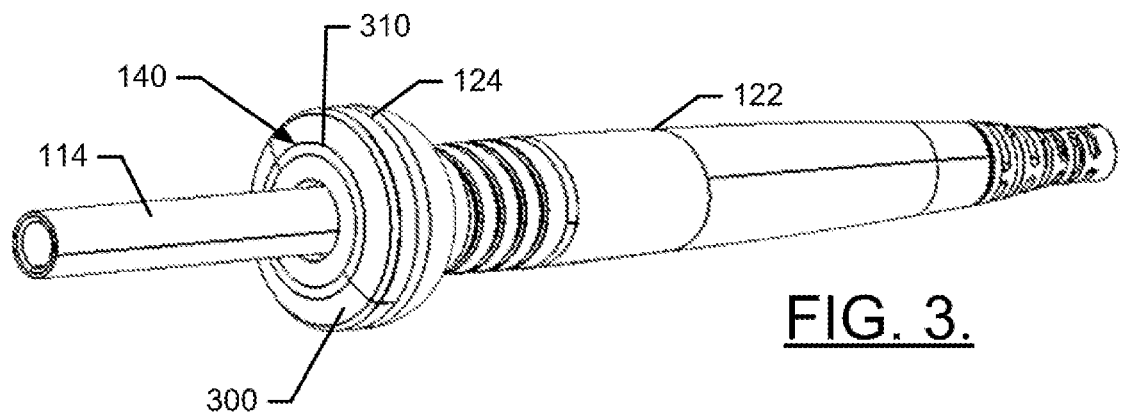
FIG. 3 illustrates a perspective view of the soldering tool of FIG. 1 in accordance with an example embodiment.
Figure 4:
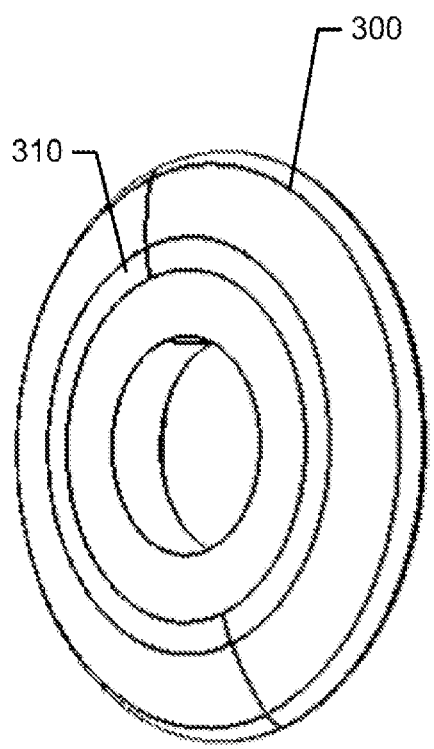
FIG. 4 illustrates a front perspective view of an end plate of a flange of the soldering tool in accordance with an example embodiment.
Figure 5:
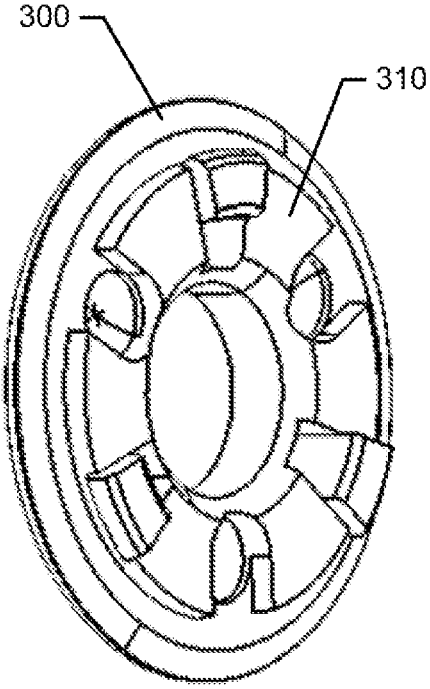
FIG. 5 illustrates a rear perspective view of the end plate in accordance with an example embodiment.
Figure 6:
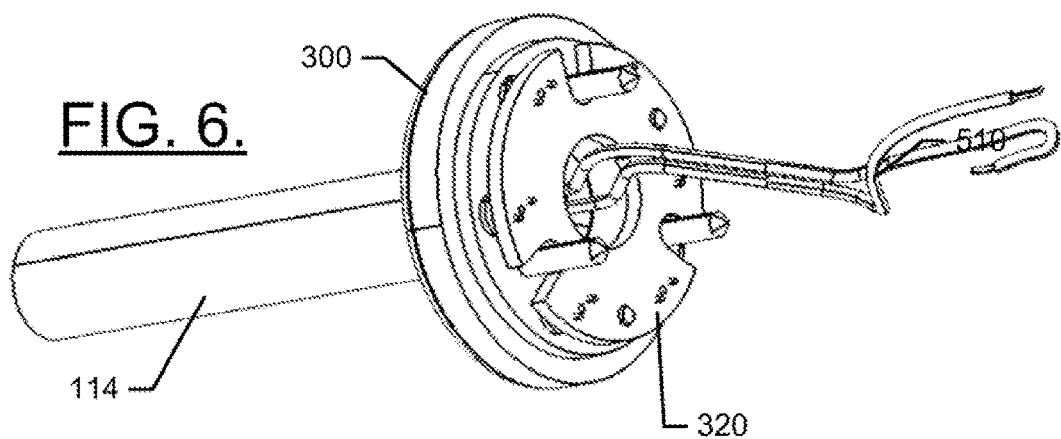
FIG. 6 illustrates a rear perspective view of a circuit board used to mount components of a light ring and the end plate in accordance with an example embodiment.
Figure 7:
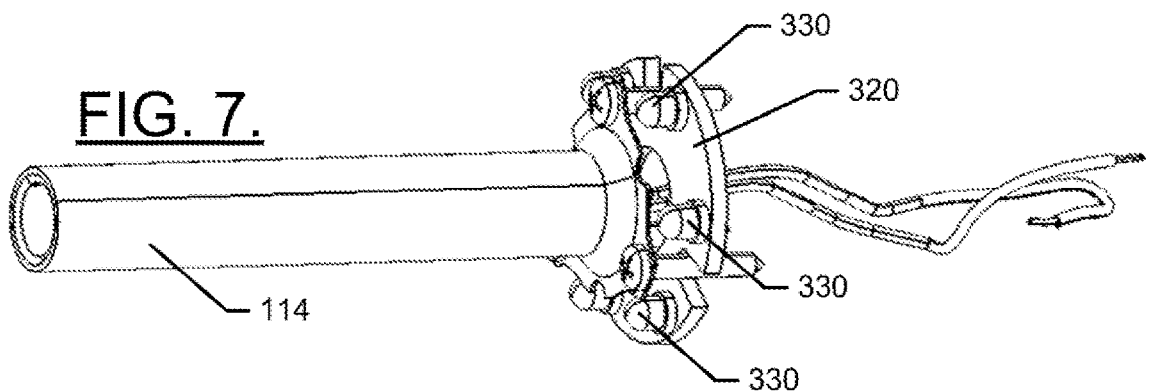
FIG. 7 illustrates a front perspective view of the circuit board in proximity to a sleeve of the soldering tool in accordance with an example embodiment.
Figure 8:
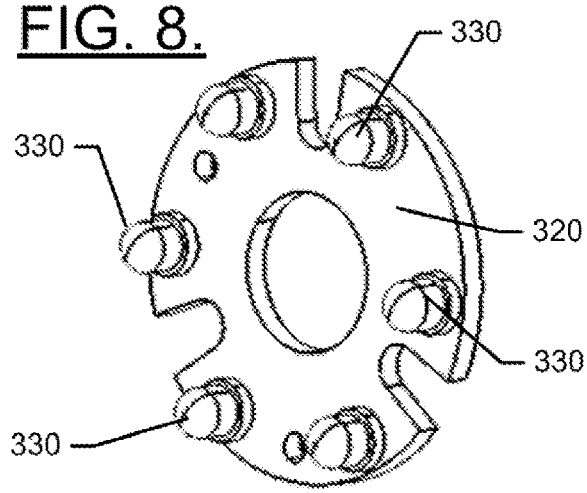
FIG. 8 illustrates a front perspective view of the circuit board in accordance with an example embodiment.
Figure 9:
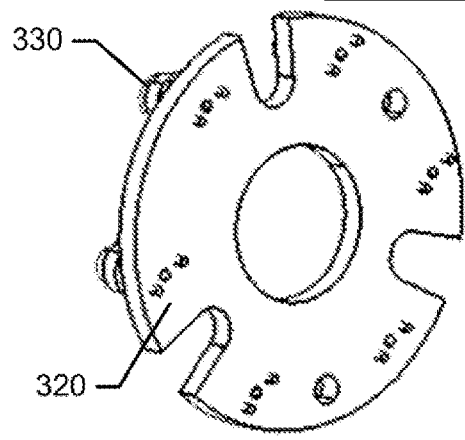
FIG. 9 illustrates a rear perspective view of the circuit board in accordance with an example embodiment.

As noted above, the handle 122 may be separated from the sleeve 114 by a flange 124. In some cases, the light ring 140 may be provided in the flange 124. FIGS. 3-9 illustrate additional views of portions of the flange 124 and/or light ring 140 to better illustrate how the light ring 140 structure could be instantiated in some example embodiments. In this regard, FIG. 3 illustrates a front perspective view of the flange 124 showing the light ring 140 extending around the sleeve 114 coaxial therewith, and evenly spaced apart therefrom in all directions around the periphery of the sleeve 114. In an example embodiment, the flange 124 may include an end face 300 having an annular lens 310 disposed therein. The end face 300 may be made of an insulating and non-translucent material and may include an annular shaped slot in which the annular lens 310 may be fitted. A perspective view of a front side (i.e., facing the tip 112) and rear side (i.e., facing away from the tip 112) of the end face 330 is shown in FIGS. 4 and 5, respectively. Meanwhile, the flange 124 may house or otherwise include therein a circuit board 320, which is shown in the rear, perspective view of FIG. 6. FIG. 7 also shows the circuit board 320 from a front perspective due to removal of the end face 300. FIGS. 8 and 9 illustrate front side (i.e., facing the tip 112) and rear side (i.e., facing away from the tip 112) of the circuit board 320.

The circuit board 320 may receive power from the power unit 130 via the cable 126. A plurality of light emitting diodes (LEDs) 330 may be mounted on the circuit board 320 and arrayed in a circular arrangement matching a diameter of the light ring 140. In particular, the LEDs 330 may be evenly spaced about a periphery of the circuit board 320 (e.g., equidistant from the longitudinal axis and from each other) in a circular arrangement having a diameter substantially equal to a diameter of the annular lens 310. The annular lens 310 may be made of glass having impurities therein for uniform light scattering, polycarbonate material, acrylic material or other translucent material that is configured to evenly spread light. In some cases, due to the annular shape of the annular lens 310, and the positioning of the LEDs 330 evenly spaced proximate to the rear side of the end face 330, the light emanating from the annular lens 310 may be directed toward the tip 112 without generating shadows. The annular lens 310 may therefor act as a "light pipe" to direct light toward the target area 152 of the workpiece 150, as described above. Moreover, the even spreading of the light around the periphery of the sleeve 114 provides the light to be directed continuously and uniformly over all 360 degrees around the target area 152 and the tip 112. Thus, there should not be any noticeable shadows or different areas of intensity that overlap each other, which can occur when individual or distinct light sources are positioned proximate to the sleeve 114 without the annular lens 310.

In an example embodiment, the circuit board 320 may include as few as three LEDs 330. However, any desirable number greater than three may also be included in alternative embodiments. In the example shown, six LEDs 330 are provided. The provision of more than three LEDs 330 may enable the controller 130 to be used to adjust various characteristics of the light emitted by the light ring 140. For example, in the case of using six LEDs 330, only three may be used in some cases and all six in others to provide two different levels of intensity for the light. The different intensity levels could be user selected or may provide information (e.g., on tip temperature or other operational status indications). In some cases, the controller 130 may also be used to provide feedback on certain conditions of the tip 112 (e.g., temperature or on/off status), or various fault conditions of the soldering tool 100. For example, the light ring 140 may blink if there is a fault condition detected. In still other examples, although the light may nominally be "white light," other colors may be generated (e.g., with additional LEDs) in order to illustrate various types of information.

In some embodiments, the circuit board 320 may provide power to the heater of the tip 112 as well as to the LEDs 330. In such cases, the provision of light via the light ring 140 may indicate that the soldering tool 100 is powered and on. No light may therefore indicate that the soldering tool 100 is either not powered or off. However, separate sources of controlling power could be employed in alternative embodiments. It should also be noted that control for operation of the LEDs 330 may be automatically tied to the operation of the soldering tool 100 (e.g., always on when the heater is powered), or may be separately actuated. For example, in some cases the user interface 132 may be used to select powering on/off of the LEDs 330.

Figure 11:
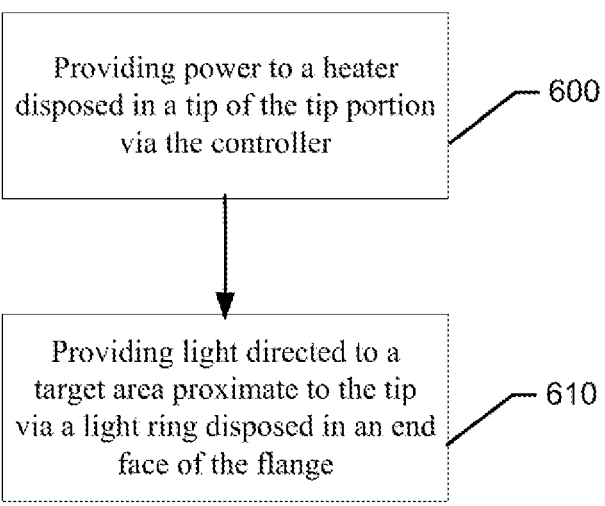
FIG. 11 illustrates a block diagram of a method of operating a soldering tool in accordance with an example embodiment.

FIG. 11 shows a block diagram of a method of operating a soldering tool that includes a tool body and a tip portion according to an example embodiment. The tool body may be configured to interface with a controller and the tool body may include a handle. The tip portion may be operably coupled to the tool body at a flange that separates the handle from the tip portion. The tip portion may also include a tip that is heated to melt solder. The method may include providing power to a heater disposed in a tip of the tip portion via the controller at operation 600, and providing light directed to a target area proximate to the tip via a light ring disposed in an end face of the flange at operation 610. In some cases, providing the light may include either turning the light on or off via a user interface, by a button or other operator positioned on the handle, or by providing the light whenever power is also provided to the heater.

Thus, according to an example embodiment, a soldering tool may be provided. The soldering tool may include a tip portion and a tool body. The tool body may include a handle and the tip portion may be operably coupled to the tool body at a flange that separates the handle from the tip portion. The tip portion may include a tip that is heated to melt solder. The flange may include an end face and a light ring disposed at the end face. The light ring may be configured to direct light toward the tip.

In some cases, the tool described above may be augmented or modified by altering individual features mentioned above or adding optional features. The augmentations or modifications may be performed in any combination and in any order. For example, in some cases, the tip portion may include a sleeve extending from the flange to the tip. The sleeve and the handle may be coaxially aligned along a longitudinal axis of the tool body, and the light ring may be coaxial with the longitudinal axis of the tool body. In an example embodiment, the light ring extends around the sleeve and is spaced apart from the sleeve. In some cases, the sleeve may include a collet configured to retain the tip without the use of tools. In an example embodiment, the light ring comprises an annular lens and a plurality of LEDs, the plurality of LEDs may be disposed at a circuit board provided proximate to the flange. In some cases, the annular lens may include glass, polycarbonate or translucent material having a first diameter. In an example embodiment, each LED of the plurality of LEDs may be disposed to be equally spaced apart from each other and spaced apart from the longitudinal axis by a distance substantially equal to the first diameter. In some cases, the annular lens lies in a plane substantially perpendicular to the longitudinal axis. In an example embodiment, the end plate may include an anti-roll stand defined by a flat portion of a peripheral edge of the end plate. In some cases, the controller may be configured to enable the light ring to be turned on or off via a user interface. In an example embodiment, the light ring may be configured to generate light when heat is applied to the tip. In some cases, light from the light ring indicates information about the tip of the soldering tool.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A soldering tool comprising:
   a tool body including a handle and a flange, wherein the flange comprises an end face and a light ring disposed at a portion of the end face;
   a tip portion operably coupled to the tool body at the flange, wherein the flange separates the handle from the tip portion, the tip portion including a tip that is able to be heated to melt solder, wherein the light ring is configured to direct light toward the tip; and
   processing circuitry configured to control a temperature of the tip and control an intensity of light output by the light ring based on the temperature of the tip to provide visual feedback information to a user regarding the temperature of the tip for melting solder.

2. The soldering tool of claim 1, wherein the tip portion comprises a sleeve extending from the flange to the tip,
   wherein the sleeve and the handle are coaxially aligned along a longitudinal axis of the tool body, and
   wherein the light ring is coaxial with the longitudinal axis of the tool body.

3. The soldering tool of claim 2, wherein the light ring extends around the sleeve and is spaced apart from the sleeve.

4. The soldering tool of claim 3, wherein the sleeve comprises a collet configured to retain the tip without the use of tools.

5. The soldering tool of claim 1, wherein the light ring comprises an annular lens and a plurality of light emitting diodes (LEDs), the plurality of LEDs being disposed at a circuit board provided proximate to the flange.

6. The soldering tool of claim 5, wherein the annular lens comprises glass, polycarbonate or translucent material having a first diameter.

7. The soldering tool of claim 6, wherein each LED of the plurality of LEDs is disposed to be equally spaced apart from each other and spaced apart from the longitudinal axis by a distance substantially equal to the first diameter.

8. The soldering tool of claim 7, wherein the processing circuitry is further configured to control the intensity of the light output by the light ring by selectively powering some of the LEDs.

9. The soldering tool of claim 1, wherein the processing circuitry comprises fault detection circuitry;
   wherein the circuitry is further configured to control the light output by the light ring based on a detection of a fault condition of the soldering tool by the fault detection circuitry.

10. The soldering tool of claim 1, wherein the processing circuitry is further configured to control the light output by the light ring to changes colors to indicate changes in operational status of the soldering tool.

11. The soldering tool of claim 1, wherein the processing circuitry is further configured to control the light output by the light ring to blink to indicate an operational status of the soldering tool.

* * * * *

UNITED STATES PATENT AND TRADEMARK OFFICE
CERTIFICATE OF CORRECTION

PATENT NO. : 12,377,486 B2
APPLICATION NO. : 17/768626
DATED : August 5, 2025
INVENTOR(S) : Bublitz et al.

Page 1 of 1

It is certified that error appears in the above-identified patent and that said Letters Patent is hereby corrected as shown below:

In the Claims

In Column 8, Claim 10, Line 43, "to changes colors" should read --to change colors--

Signed and Sealed this
Twenty-fifth Day of November, 2025

John A. Squires
*Director of the United States Patent and Trademark Office*